United States Patent
Chen et al.

(10) Patent No.: US 7,755,996 B2
(45) Date of Patent: Jul. 13, 2010

(54) METHOD FOR ADJUSTING WRITE STRATEGY

(75) Inventors: Ling-Feng Chen, Hsinchu (TW); Chien-Li Hung, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 821 days.

(21) Appl. No.: 11/455,119

(22) Filed: Jun. 16, 2006

(65) Prior Publication Data

US 2006/0285466 A1    Dec. 21, 2006

Related U.S. Application Data

(60) Provisional application No. 60/691,622, filed on Jun. 17, 2005.

(51) Int. Cl.
*G11B 7/0045* (2006.01)

(52) U.S. Cl. .................... 369/59.12

(58) Field of Classification Search .......... 369/59.11, 369/53.1, 47.5, 47.53, 59.12
See application file for complete search history.

(56) References Cited

U.S. PATENT DOCUMENTS

| | | | | |
|---|---|---|---|---|
| 5,327,411 A * | 7/1994 | Iwasa et al. | | 369/59.12 |
| 6,175,541 B1 * | 1/2001 | Shoji et al. | | 369/47.52 |
| 6,392,569 B1 * | 5/2002 | Mimachi et al. | | 341/58 |
| 6,697,311 B1 * | 2/2004 | Kim | | 369/59.1 |
| 7,006,420 B1 * | 2/2006 | Hsu et al. | | 369/59.12 |
| 7,486,604 B2 * | 2/2009 | Nakajo | | 369/59.12 |
| 7,496,014 B2 * | 2/2009 | Sekiguchi et al. | | 369/47.53 |
| 7,557,863 B2 * | 7/2009 | Keating et al. | | 348/497 |
| 2005/0099925 A1 * | 5/2005 | Nakajo | | 369/59.12 |
| 2005/0265184 A1 * | 12/2005 | Sekiguchi et al. | | 369/47.53 |
| 2006/0262692 A1 * | 11/2006 | Yu et al. | | 369/59.11 |
| 2006/0285461 A1 * | 12/2006 | Ashizaki et al. | | 369/53.16 |

* cited by examiner

*Primary Examiner*—Hoa T Nguyen
*Assistant Examiner*—Mark L Fischer
(74) *Attorney, Agent, or Firm*—Thomas, Kayden, Horstemeyer & Risley

(57) ABSTRACT

In a method for adjusting a write strategy, data is written into the optical disc according to a first write strategy in forms of a first type of data storage structures with variable lengths and a second type of data storage structures with variable lengths. A plurality of the first type of data storage structures corresponding to a specified reference length are located, and the recording lengths thereof are operated with the specified reference length to obtain a first averaged deviation. A plurality of the second type of data storage structures formed next to the first type of data storage structures are located, and the recording lengths thereof are operated with respective reference lengths to obtain a second averaged deviation. A parameter of the first write strategy is adjusted so as to generate a second write strategy for subsequently writing data into the optical disc.

14 Claims, 14 Drawing Sheets

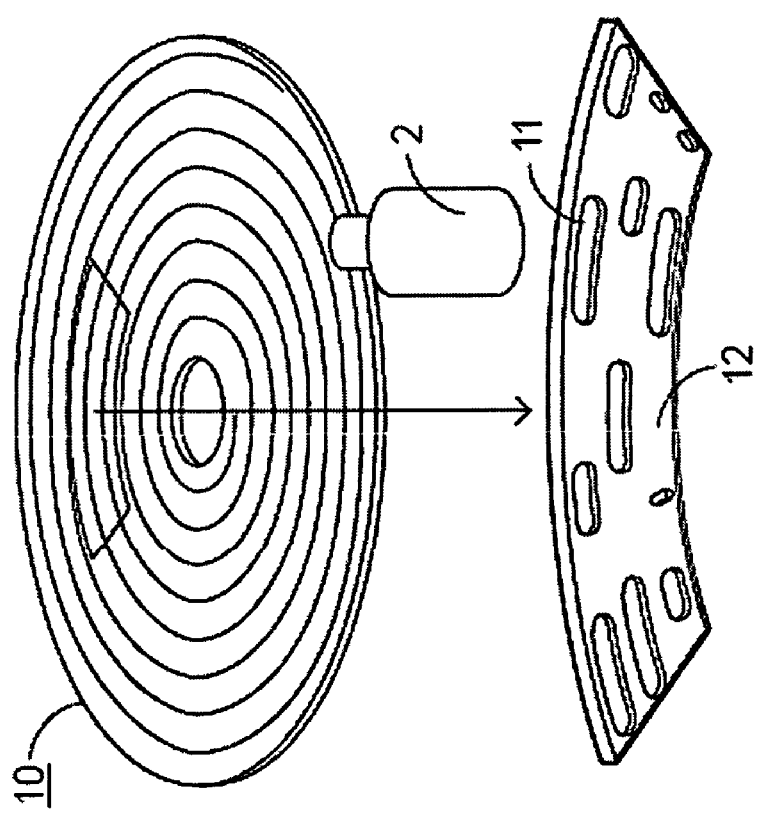

METHOD FOR ADJUSTING WRITE STRATEGY

CROSS-REFERENCE TO RELATED APPLICATION

This application claims the benefit of U.S. provisional application Ser. No. 60/691,622, filed Jun. 17, 2005, the contents of which are incorporated herein by reference.

FIELD OF THE INVENTION

The present invention relates to a method for adjusting a write strategy of an optical recording/reproducing apparatus, and more particularly to a method for adjusting a write strategy of an optical recording/reproducing apparatus according to a feature of an optical disc.

BACKGROUND OF THE INVENTION

With the advent of information-oriented society, an optical disc with a large capacity for recording a great amount of information has been widely used. A great variety of optical discs are developed nowadays. For example, CD-ROM (Compact Disc Read Only Memory) is a kind of optical disc that has recorded data therein for read purpose only. CD-R (Compact Disc-Recordable) and CD-RW (Compact Disc-ReWritable) are two other kinds of optical discs, different from CD-ROM, allowing data to be written to the optical disc by a user.

CD-R exhibits the writable feature due to a special dye layer coated thereon. When the optical head emits programmed laser light onto the dye layer of the CD-R, specified portions of the dye layer receiving the light are heated up to 250 degrees C. and thus melted to form "pits", otherwise remain as "lands". Data are then recorded in the optical disc by way of the resulting pits and lands. FIG. 1(a) depicts an optical disc 10 with exemplified pits 11 and lands 12 in a partially enlarged view. An optical head 2 is disposed at a side of the optical disc 10, records data into the optical disc 10 according to a write strategy, and realizes information from the optical disc 10 according to the previously formed pit-land configuration of the optical disc 10.

CD-RW, compared to CD-R, is advantageous because of its erasable and rewritable feature. The data recording in a CD-RW disc is dominated by phase change, e.g. the differential reflection rates between the crystalline phase and the amorphous phase of the CD-RW material.

A CD-RW disc includes a recording material layer formed of an alloy of four metals, i.e. silver, indium, antimony and tellurium, and capable of switching between the crystalline phase and amorphous phase. The phase change of the recording material layer is rendered by diode laser power. The power typically applied for writing is from 8 mW to 14 mW and 4~8 mW for erasing, and the bias power is 0~1 mW. The melting point of the recording material layer is about 600 degrees C., while the crystallization temperature is about 200 degrees C. Likewise, lands and pits are formed in a CD-RW disc to record data. As shown in FIG. 1(b), for forming a land structure 22 in a specified region of a CD-RW disc 20, an erasing procedure is performed. Meanwhile, the laser power pulse signal 200 is emitted by the optical head 2 and maintained at a level 201 for a certain period of time to have the temperature of the erased region remain between the melting point and the crystallization temperature so as to crystallize. On the other hand, for forming a pit structure 21 in a specified region of the CD-RW disc 20, a writing procedure is performed. In the writing procedure, the laser power pulse signal 200 emitted by the optical head 2 is switched between a level 202 higher than the level 201 for erasing and a level 203 lower than the level 202. In this way, the recording material layer in the specified region will reach the melting point in a short time. Then, the laser power pulse signal 200 is suspended so as to cool the recording material layer promptly. The formation of a relatively long pit would require repetitive pulse operations between the levels 201 and 203.

When the optical disc is inserted into an optical recording/reproducing apparatus to be read, a laser beam is emitted from an optical head of the optical recording/reproducing apparatus and reflected by these pits and lands with different reflection rates. For example, while the majority of the light emitted onto the lands is reflected, only 10 to 20 percents of the light emitted on to the pits can be reflected due to destructive interference. The reflected light is then received and processed by the optical head to reveal the previously recorded information.

As writing quality varies with types or makes of optical discs if the same writing condition is applied, different write strategies are given by the manufacturers for writing a variety of optical discs so as to improve writing quality. A write strategy is generally necessary to take a plurality of parameters into consideration, e.g. power for writing, power for erasing and bias power. Therefore, to build up a write strategy for each optical disc is a huge, complicated and time-consuming task.

SUMMARY OF THE INVENTION

The present invention provides a method for adjusting a write strategy of an optical recording/reproducing apparatus according to a feature of an optical disc.

According to an embodiment of the present method for adjusting a write strategy of an optical recording/reproducing apparatus for writing data into an optical disc includes steps of: writing data into the optical disc according to a first write strategy wherein the data is stored in the optical disc in forms of a first type of data storage structures with variable lengths and a second type of data storage structures with variable lengths; locating a plurality of the first type of data storage structures corresponding to a specified reference length and operating the recording lengths of the plurality of the first type of data storage structures with the specified reference length to obtain a first averaged deviation; locating a plurality of the second type of data storage structures formed next to the first type of data storage structures and operating the recording lengths of the second type of data storage structures with respective reference lengths to obtain a second averaged deviation; and adjusting a parameter of the first write strategy so as to generate a second write strategy for subsequently writing data into the optical disc.

DESCRIPTION OF THE DRAWINGS

The above contents of the present invention will become more readily apparent to those ordinarily skilled in the art after reviewing the following detailed description and accompanying drawings, in which:

FIG. 1(a) is a schematic diagram illustrating pit-land configuration of an optical disc, which carries the information recorded in the optical disc;

DETAILED DESCRIPTION OF THE PREFERRED EMBODIMENT

Figure 2:
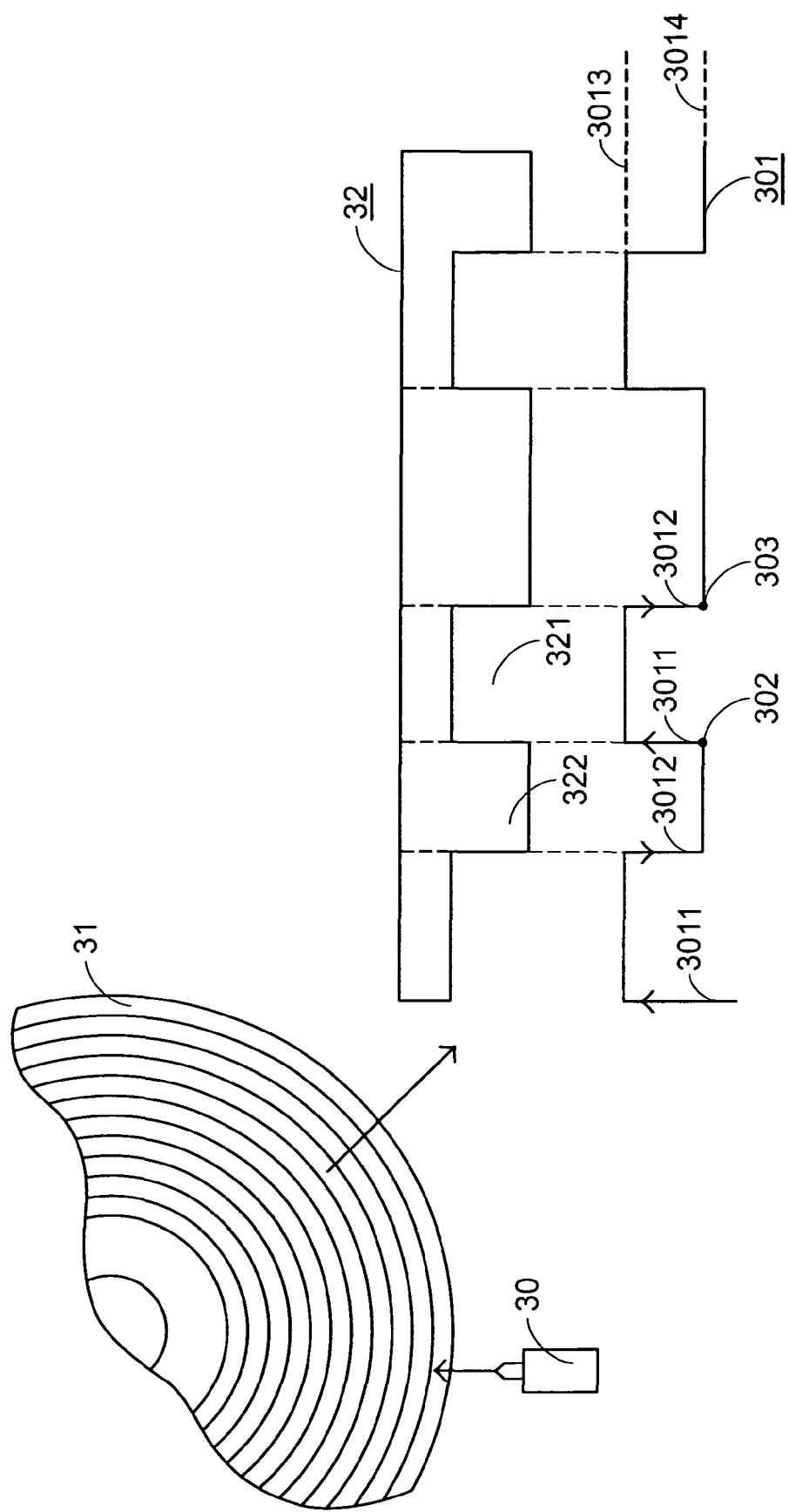
FIG. 2 is a waveform diagram illustrating the relationship between a laser power pulse signal and a land/pit configuration of an optical disc.

A write strategy generally involves a plurality of parameters. For example, referring to FIG. 2, the laser power pulse signal 301 emitted by an optical head 30 for writing data varies with the write strategy. Furthermore, the parameters for determining the waveform of the laser power pulse signal 301 include rising time points 302 and falling time points 303 for locating a rising edge 3011 and a falling edge 3012. The rising edge indicates that the power for writing is switched from a relatively low level 3014 to a relatively high level 3013, while the falling edge indicates that the power for writing is switched from the relatively high level 3013 to the relatively low level 3014. According to the rising time points 302 and falling time points 303, the length of a first data-recording structure 321 and the length of a second data-recording structure 322 can be realized on a dye layer 32 of a recordable disc 31. The first data-recording structure 321 and the second data-recording structure 322, for example, are a pit structure and a land structure, respectively.

Figure 1B:
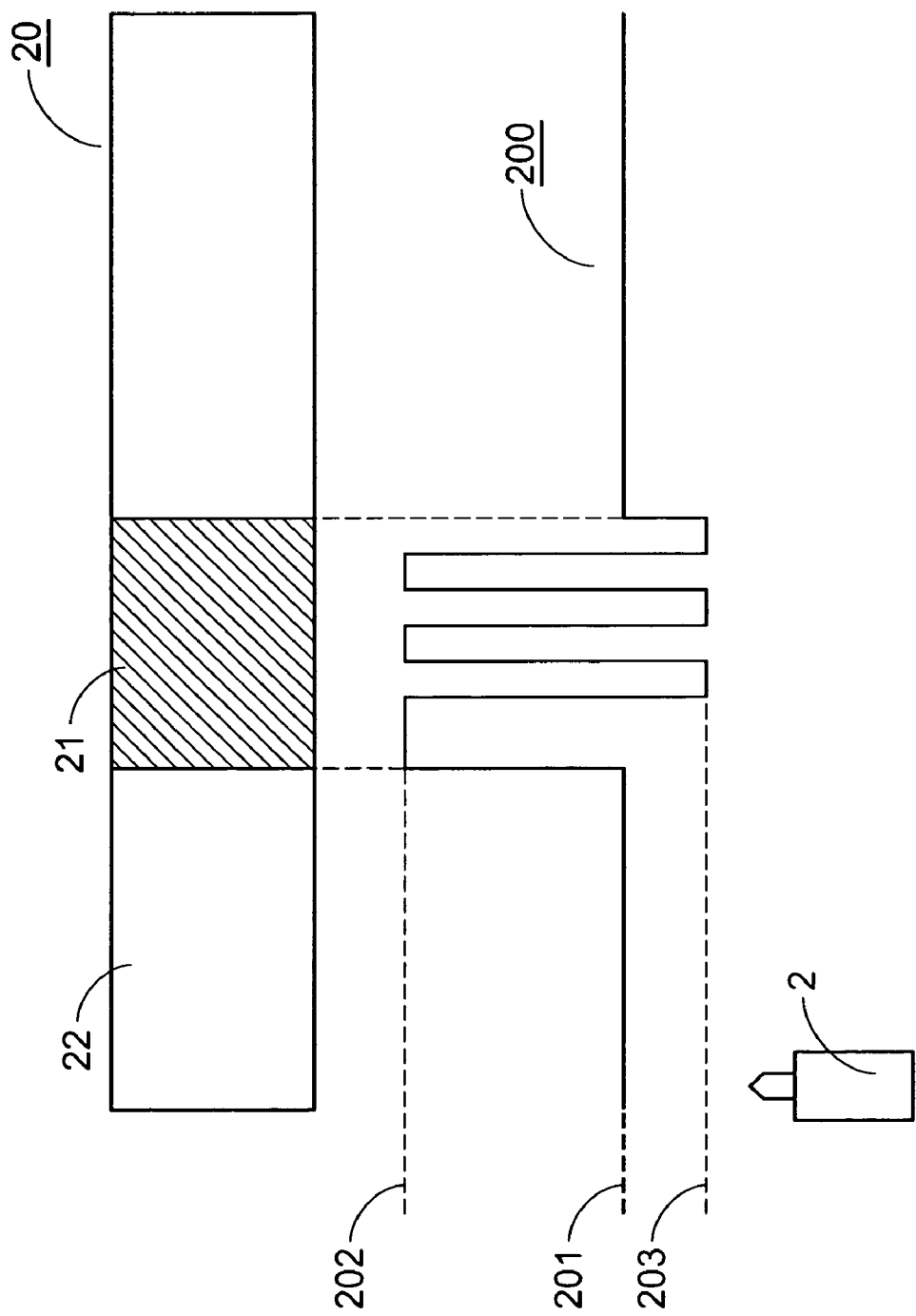
FIG. 1(b) is a schematic pulse diagram illustrating the laser power control for erasing and writing a CD-RW.
Figure 1C:
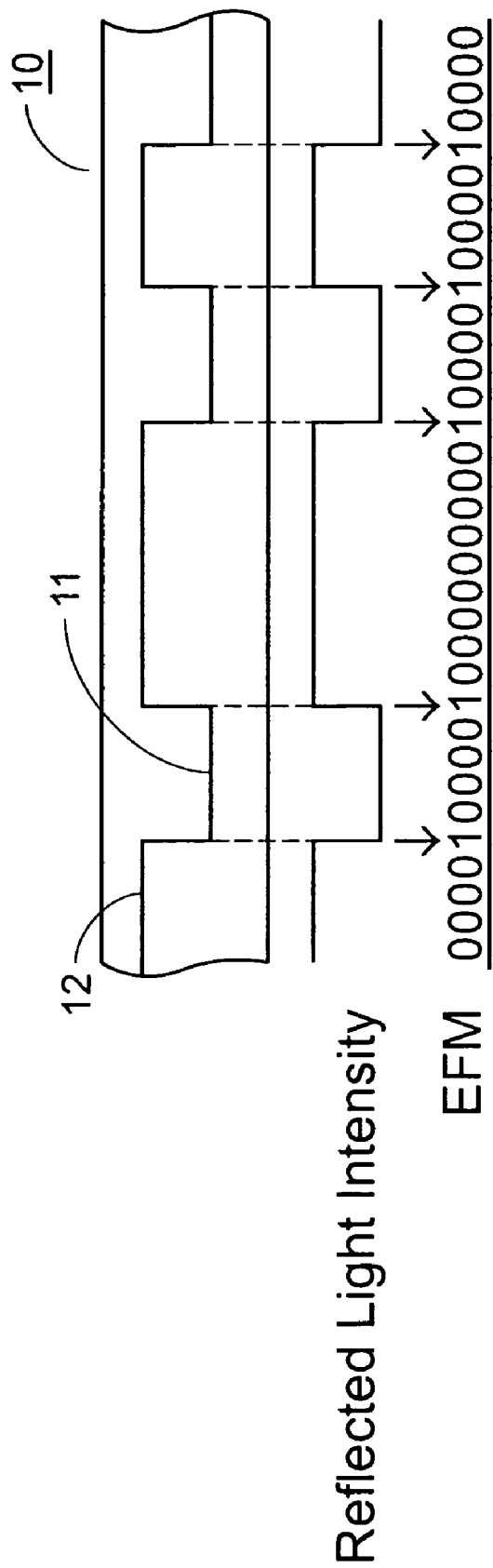
FIG. 1(c) is a schematic waveform diagram illustrating digitized pits and lands according to the EFM recording mode.

The digitization of the pits and lands of an optical disc is exemplified in FIG. 1(c), in which continuous pits as well as continuous lands are recorded and read as a series of bits "0", and the edge between a pit and a land is recorded and read as a bit "1". This recording mode is referred to as Eight-to-Fourteen Modulation (EFM). According to EFM recording mode, the number of continuous bits "0" between two separate bits "1" is limited to a range between 2 (minimum recording length "3T") and 10 (maximum recording length "11T").

Ideally, the resulting lands and pits has a length exactly equal to a recording length 3T, 4T, . . . , or 11T in the EFM mode. However, the recording length may deviate from the ideal length when the write strategy is improper. For example, referring to FIG. 3, the pit structure 4 has a recording length of 3T on the dye layer 32. Accordingly, the real length of all pit structures 4 existing in the optical disc and supposed to have a recording length 3T is calculated to obtain an averaged recording length. The standard length is subtracted from the averaged recording length so as to realize a first averaged deviation 40. A second averaged deviation 41 is realized by subtracting respective standard lengths (3T to 11T) from the real lengths of all land structures 5 at a side of the pit structures 4 and then averaging the differences. Likewise, a third averaged deviation 42 can be realized in a similar way for the land structures 6 at the other side of the pit structures 4. After the first, second and third averaged deviation 40, 41 and 42 are obtained, a write strategy specific and beneficial to an optical disc can be derived by adjusting the existent write strategy.

The adjustment of a write strategy according to the present invention is to minimize deviation of the recording length of target structures, e.g. the pit structures 4, and preferably, minimize deviation of the recording length of structures next to the target structures, e.g. the land structures 5 or 6 at the same time. Examples are given as follows to show how the write strategy is adjusted.

Figure 4A:
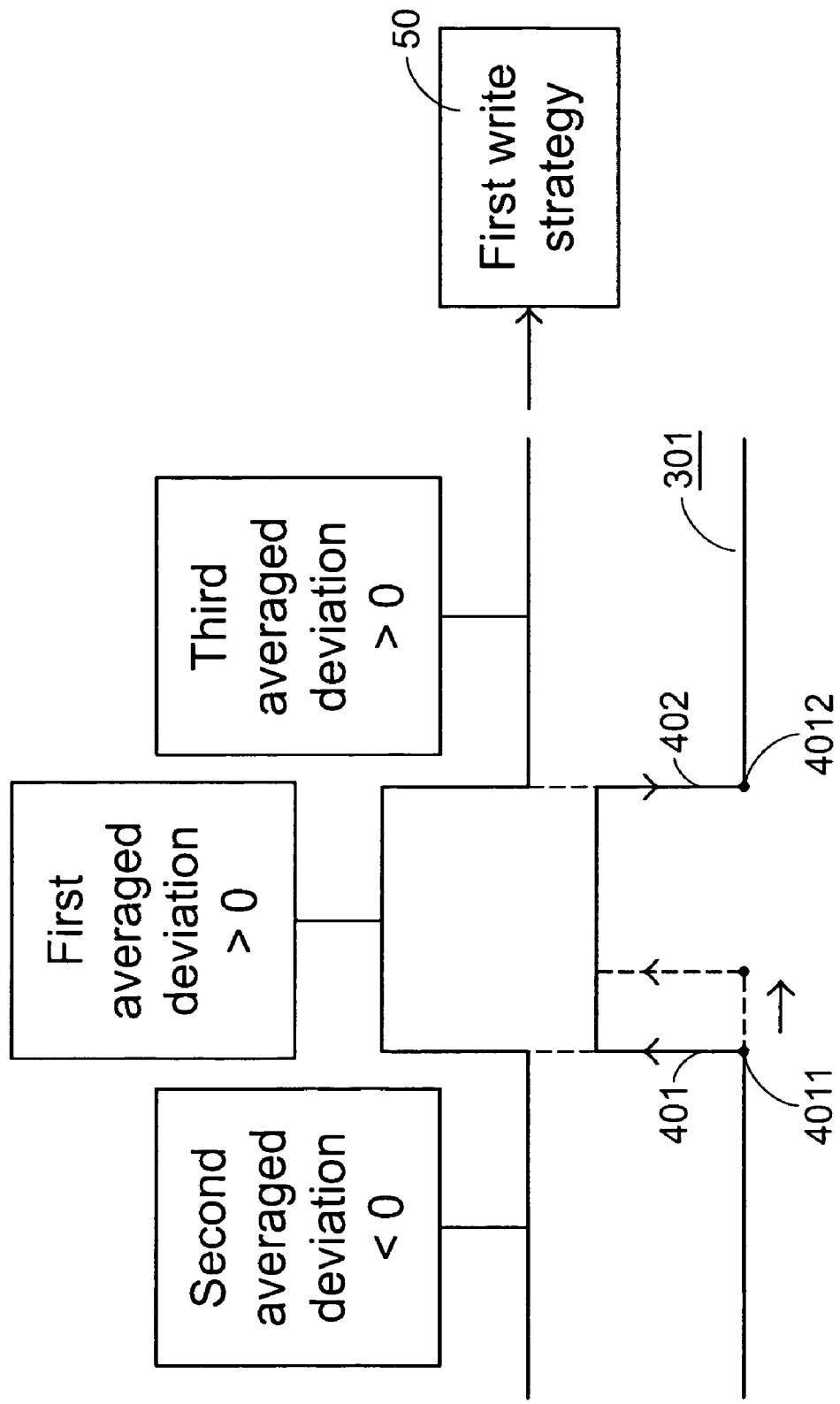
FIGS. 4(a), 4(b), 4(c), 4(d), 4(e), 4(f), 4(g) and 4(h) are schematic diagrams illustrating examples for the write-strategy adjustment according to an embodiment of the present invention.

FIG. 4(a) depicts a situation that the first and third averaged deviations 40 and 42 are greater than zero but the second averaged deviation 41 is less than zero. Under this circumstance, the rising time point 4011 resulting in the rising edge 401 of the laser power pulse signal 301 is desirably delayed, as indicated by the dash line, to reduce both the first and second averaged deviations 40 and 41. Therefore, according to an embodiment of the present invention, the write strategy is adjusted into a first write strategy 50 by delaying the rising time point of the laser power pulse signal 301 when the first and third averaged deviations 40 and 42 are greater than zero but the second averaged deviations 41 is less than zero.

Figure 4B:
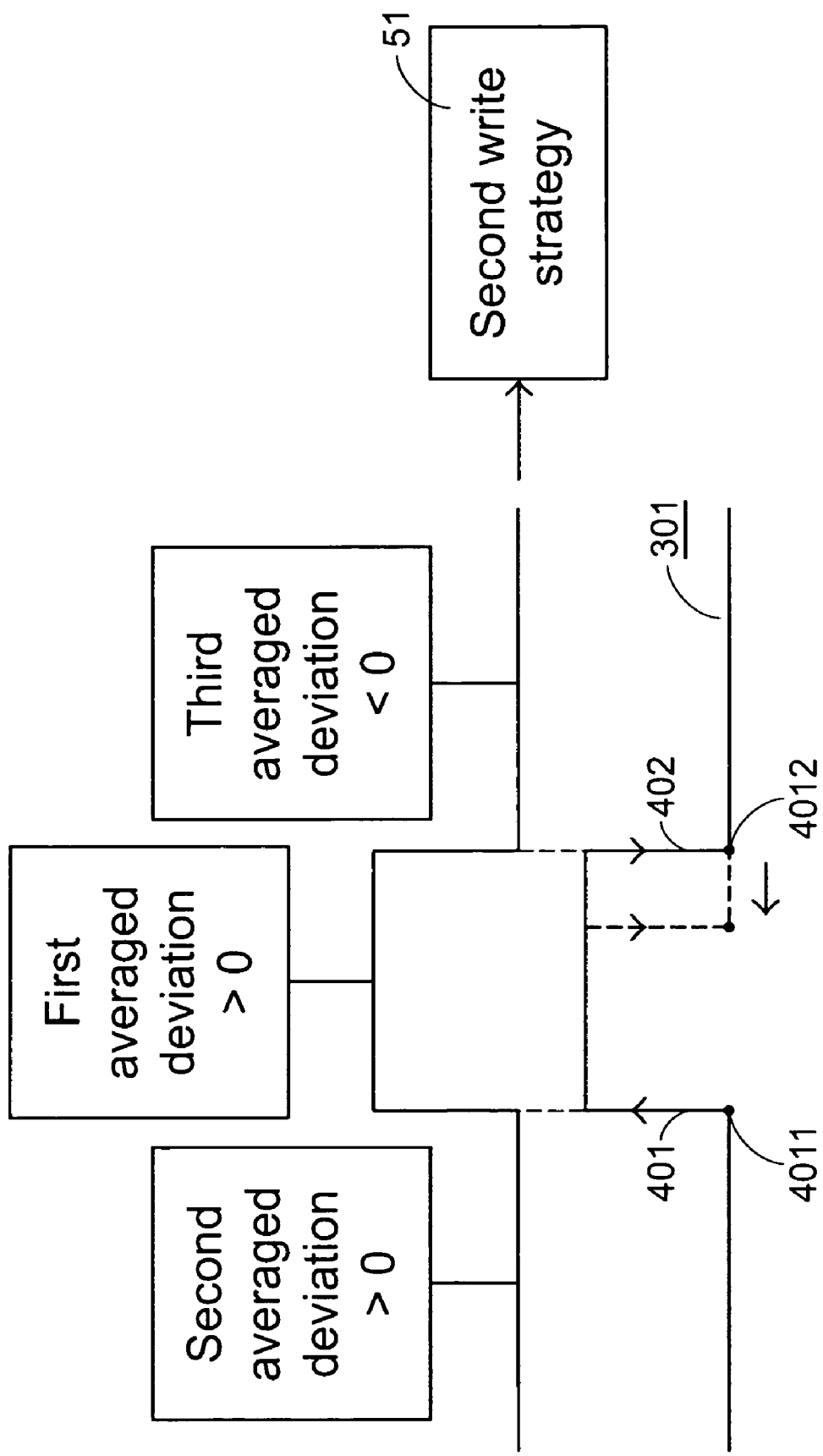

FIG. 4(b) depicts a situation that the first and second averaged deviations 40 and 41 are greater than zero but the third averaged deviation 42 is less than zero. Under this circumstance, the falling time point 4012 resulting in the falling edge 402 of the laser power pulse signal 301 is desirably made earlier, as indicated by the dash line, to reduce both the first and third averaged deviations 40 and 42. Therefore, according to an embodiment of the present invention, the adjusted second write strategy 51 involves earlier falling time point of the laser power pulse signal 301 when the first and second averaged deviations 40 and 41 are greater than zero but the third averaged deviations 42 is less than zero.

Figure 4C:
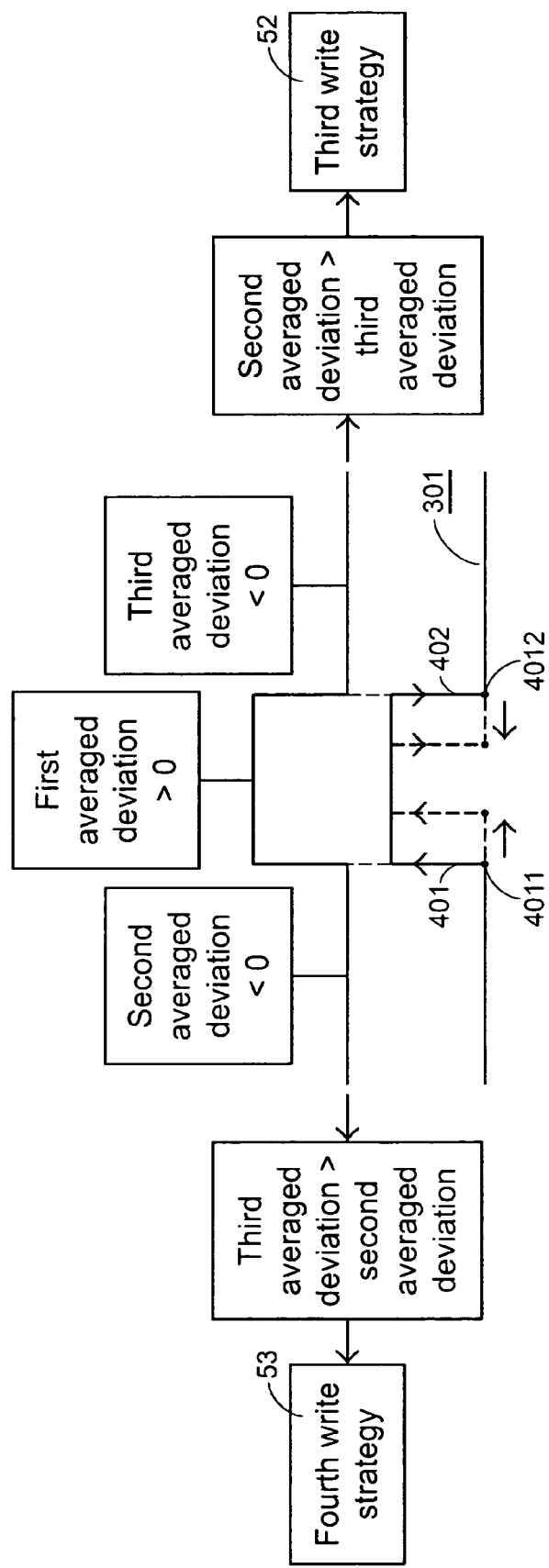

FIG. 4(c) depicts a situation that the first averaged deviation 40 is greater than zero but the second and third averaged deviations 41 and 42 are less than zero. Under this circumstance, the present invention may either delay the rising edge 401 or move the falling edge 402 ahead. When the second averaged deviation 41 is greater than the third averaged deviation 42, the write strategy is preferably adjusted into a third write strategy 52 wherein the falling time point 4012 resulting in the falling edge 402 of the laser power pulse signal 301 is moved ahead to reduce both the first and third averaged deviations 40 and 42. On the contrary, when the second averaged deviation 41 is less than the third averaged deviation 42, the write strategy is preferably adjusted into a fourth write strategy 53 wherein the rising time point 4011 resulting in the rising edge 401 of the laser power pulse signal 301 is delayed to reduce both the first and second averaged deviations 40 and 41.

Figure 4D:
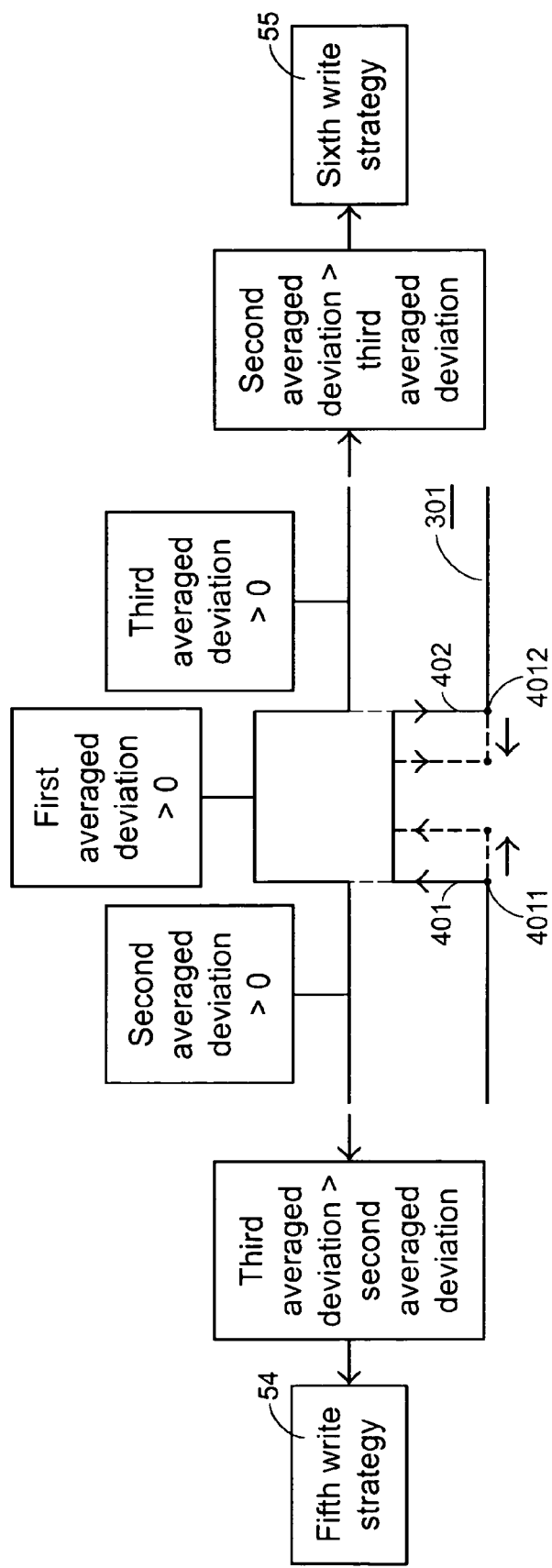

FIG. 4(d) depicts a situation that all the first, second and third averaged deviations 40, 41 and 42 are greater than zero. Under this circumstance, the present invention may either delay the rising edge 401 or move the falling edge 402 ahead. When the first averaged deviation 40 is greater than each of the second and third averaged deviations 41 and 42, and the second averaged deviation 41 is smaller than the third averaged deviation 42, the write strategy is preferably adjusted into a fifth write strategy 54 wherein the rising time point 4011 resulting in the rising edge 401 of the laser power pulse signal 301 is delayed to reduce both the first and second averaged deviations 40 and 41. On the other hand, when the second averaged deviation 41 is greater than the third averaged deviation 42, the write strategy is preferably adjusted into a sixth write strategy 55 wherein the falling time point 4012 resulting in the falling edge 402 of the laser power signal 301 is moved ahead to reduce both the first and third averaged deviations 40 and 42.

Figure 4E:
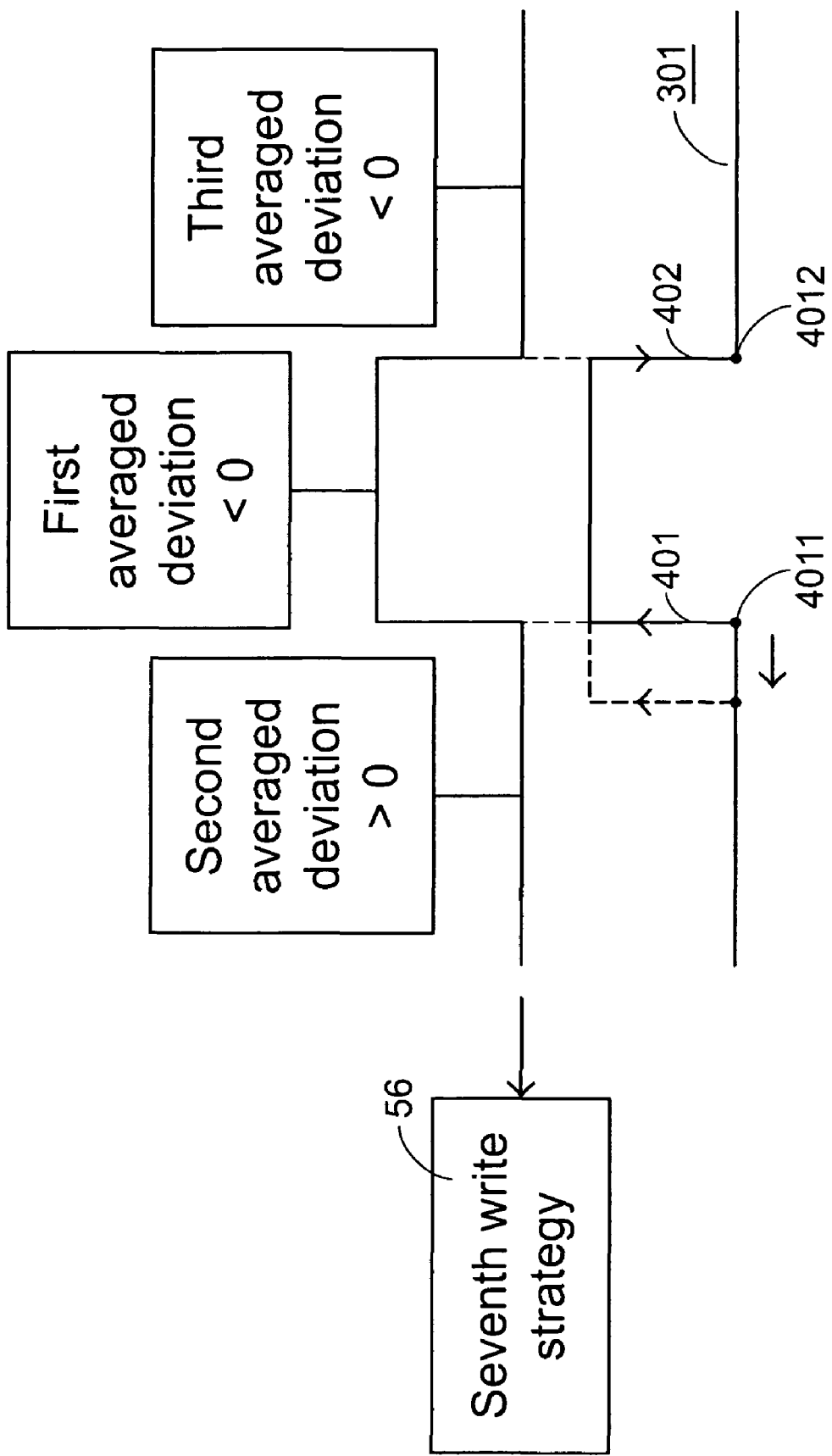
Figure 4F:
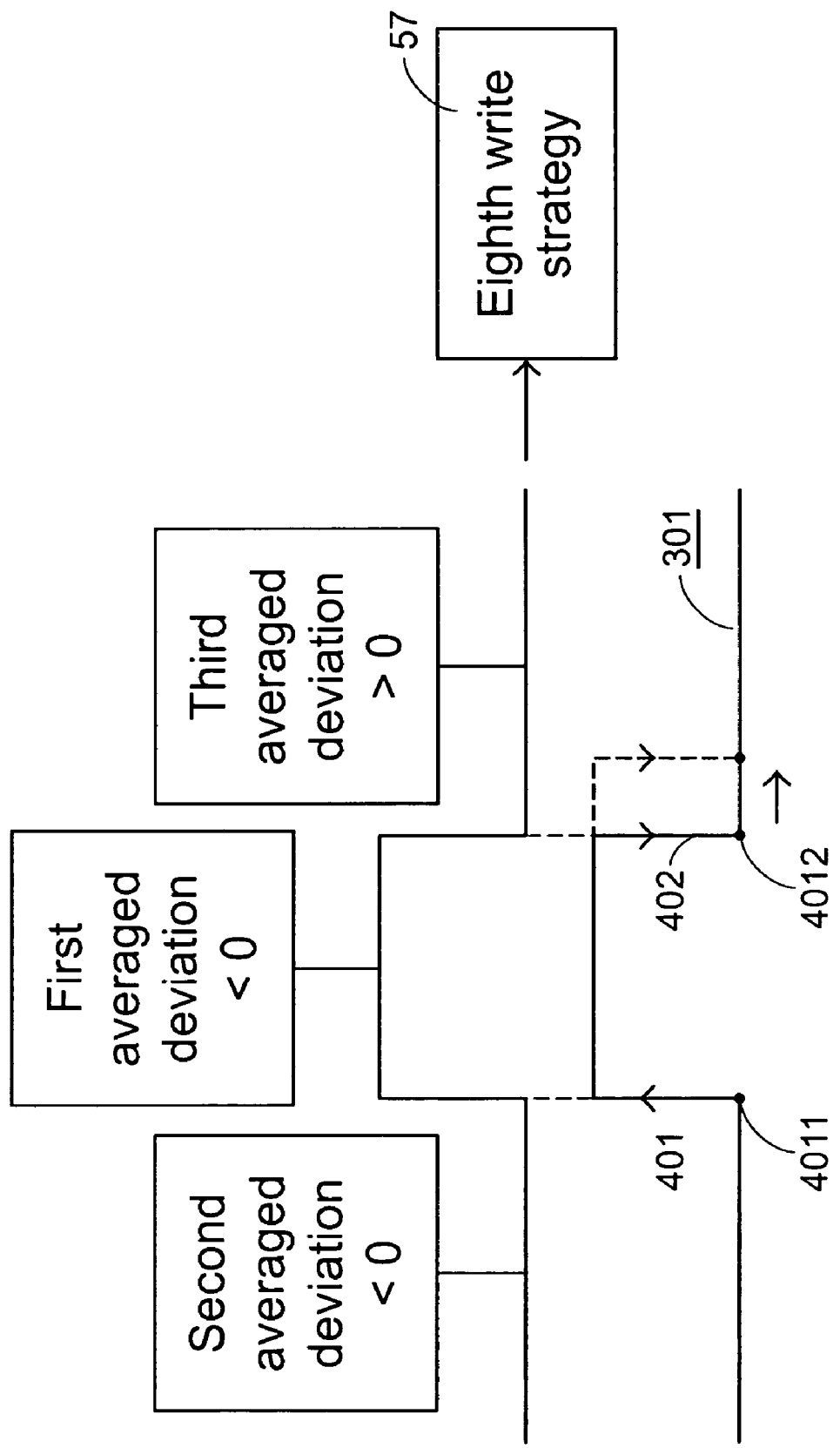
Figure 4G:
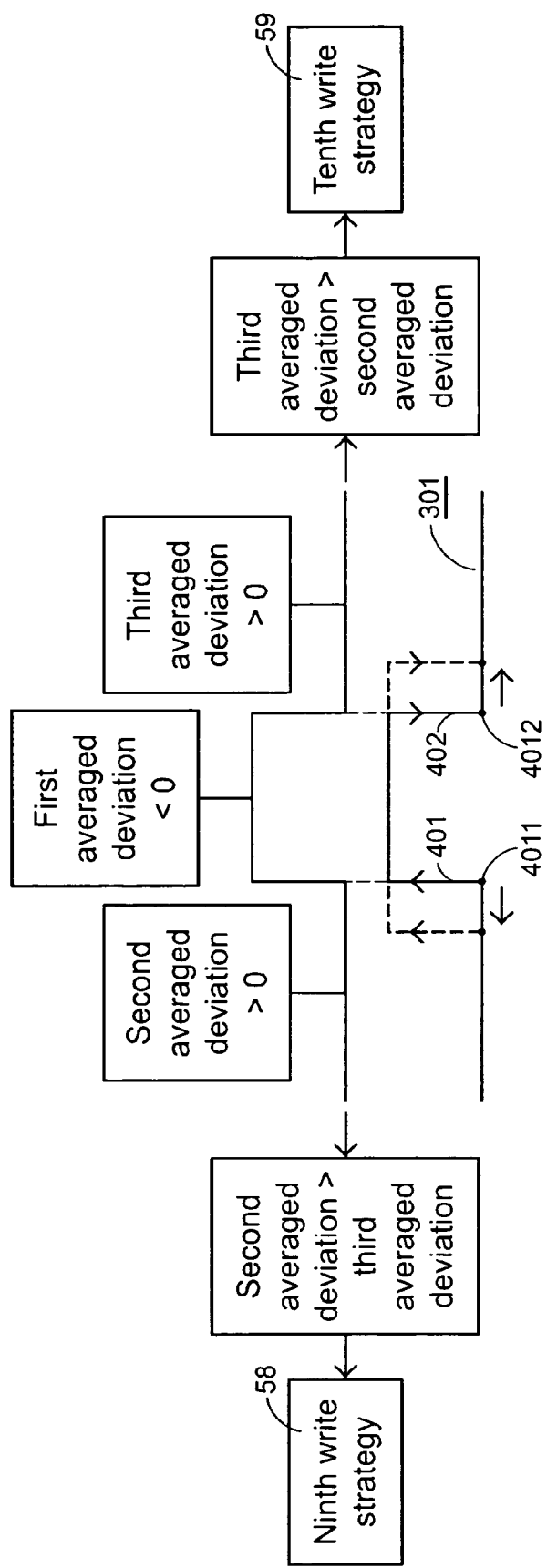
Figure 4H:
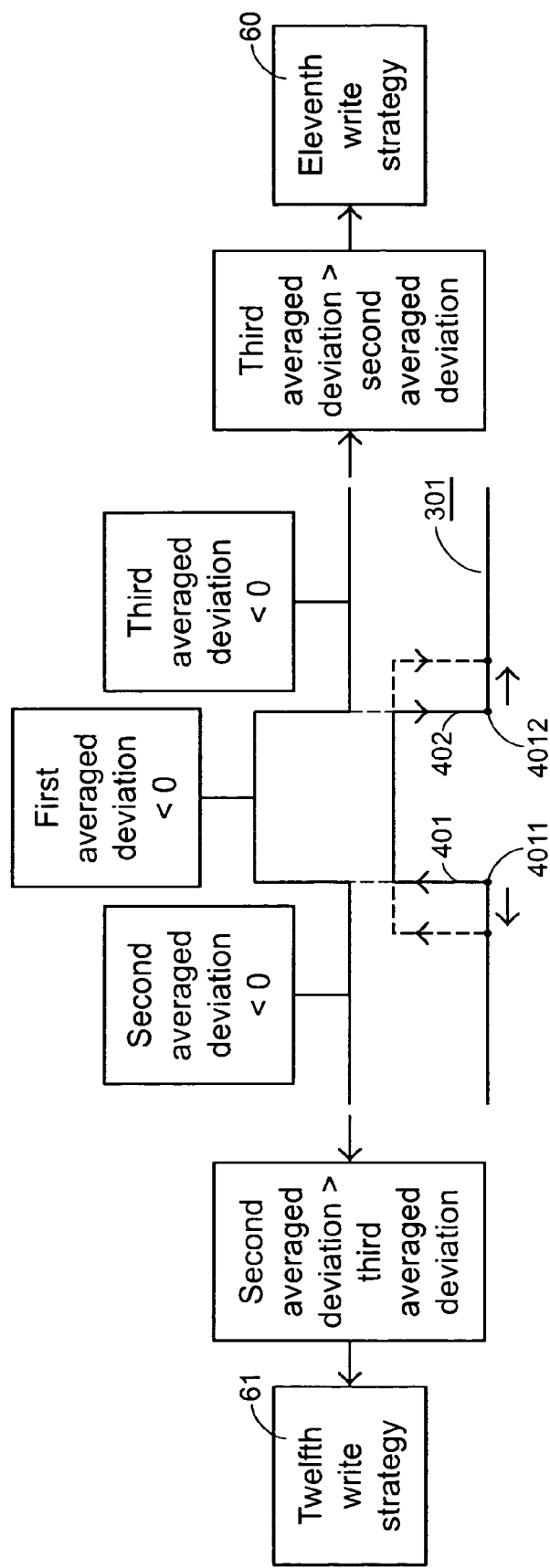

FIG. 4(e) depicts a situation that the first and third averaged deviations 40 and 42 are smaller than zero but the second averaged deviation 41 is greater than zero. Under this circumstance, the rising time point 4011 resulting in the rising edge 401 of the laser power pulse signal 301 is desirably advanced, as indicated by the dash line, to reduce both the first and second averaged deviations 40 and 41. Therefore, according to an embodiment of the present invention, the write strategy is adjusted into a seventh write strategy 56 by moving the rising time point of the laser power pulse signal 301 ahead when the first and third averaged deviations 40 and 42 are less than zero but the second averaged deviations 41 is greater than zero.

FIG. 4(*f*) depicts a situation that the first and second averaged deviations 40 and 41 are less than zero but the third averaged deviation 42 is greater than zero. Under this circumstance, the falling time point 4012 resulting in the falling edge 402 of the laser power pulse signal 301 is desirably delayed, as indicated by the dash line, to reduce both the first and third averaged deviations 40 and 42. Therefore, according to an embodiment of the present invention, the adjusted eighth write strategy 57 involves earlier falling time point of the laser power pulse signal 301 when the first and second averaged deviations 40 and 41 are less than zero but the third averaged deviations 42 is greater than zero.

FIG. 4(*g*) depicts a situation that the first averaged deviation 40 is less than zero but the second and third averaged deviations 41 and 42 are greater than zero. Under this circumstance, the present invention may either advance the rising edge 401 or delay the falling edge 402. When the second averaged deviation 41 is greater than the third averaged deviation 42, the write strategy is preferably adjusted into a ninth write strategy 58 wherein the rising time point 4011 resulting in the rising edge 401 of the laser power pulse signal 301 is moved ahead to reduce both the first and second averaged deviations 40 and 41. On the contrary, when the second averaged deviation 41 is less than the third averaged deviation 42, the write strategy is preferably adjusted into a tenth write strategy 59 wherein the falling time point 4012 resulting in the falling edge 402 of the laser power pulse signal 301 is delayed to reduce both the first and third averaged deviations 40 and 42.

FIG. 4(*h*) depicts a situation that all the first, second and third averaged deviations 40, 41 and 42 are less than zero. Under this circumstance, the present invention may either advance the rising edge 401 or delay the falling edge 402. When the first averaged deviation 40 is smaller than each of the second and third averaged deviations 41 and 42, and the second averaged deviation 41 is smaller than the third averaged deviation 42, the write strategy is preferably adjusted into an eleventh write strategy 60 wherein the falling time point 4012 resulting in the falling edge 402 of the laser power pulse signal 301 is delayed to reduce both the first and third averaged deviations 40 and 42. On the other hand, when the second averaged deviation 41 is greater than the third averaged deviation 42, the write strategy is preferably adjusted into a twelfth write strategy 61 wherein the rising time point 4011 resulting in the rising edge 401 of the laser power pulse signal 301 is moved ahead to reduce both the first and second averaged deviations 40 and 41.

In the above examples, one of the rising time point and falling time point is adjusted, either delayed or advanced. However, by way of proper software designs, the write strategy can also be adjusted by delaying/advancing both the rising time point and falling time point on the condition that the deviation of the land and pit structures could be reduced.

The recording length, although exemplified between 3T and 11T, can also be 14T (for DVD) or any other length, depending on the adopted recording mode.

In an embodiment, the second and third averaged deviations 41 and 42 are obtained based on all kinds of recording length, e.g. from 3T to 11T and 14T. Alternatively, the second and third averaged deviations 41 and 42 can be obtained based on two or three kinds of recording length, e.g. 3T and 7T, or 8T, 9T and 11T. While the former is higher in precision, the latter is higher in speed.

Figure 3:
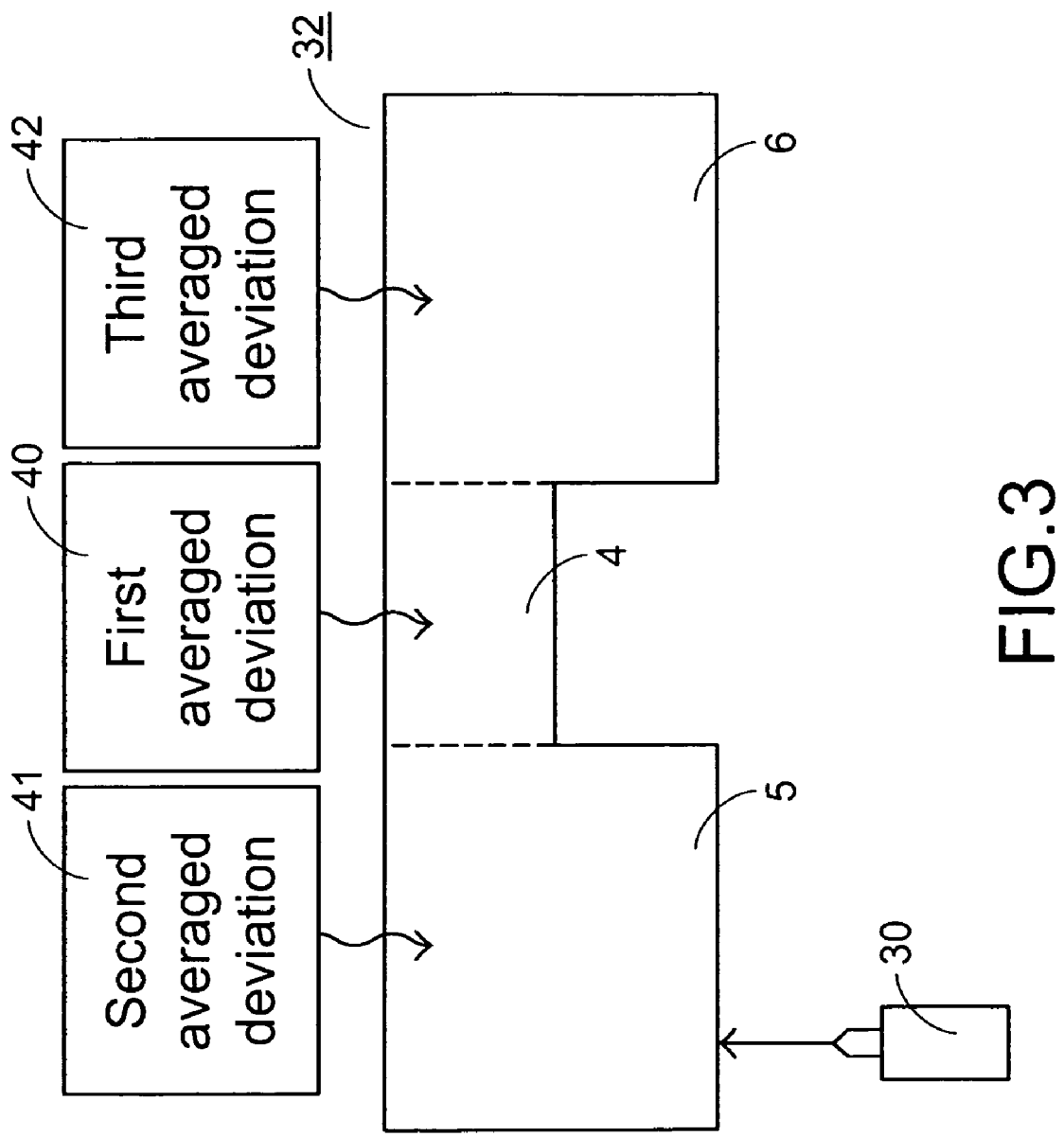
FIG. 3 is a schematic diagram illustrating parameters for implementing an embodiment of the present invention.
Figure 5:
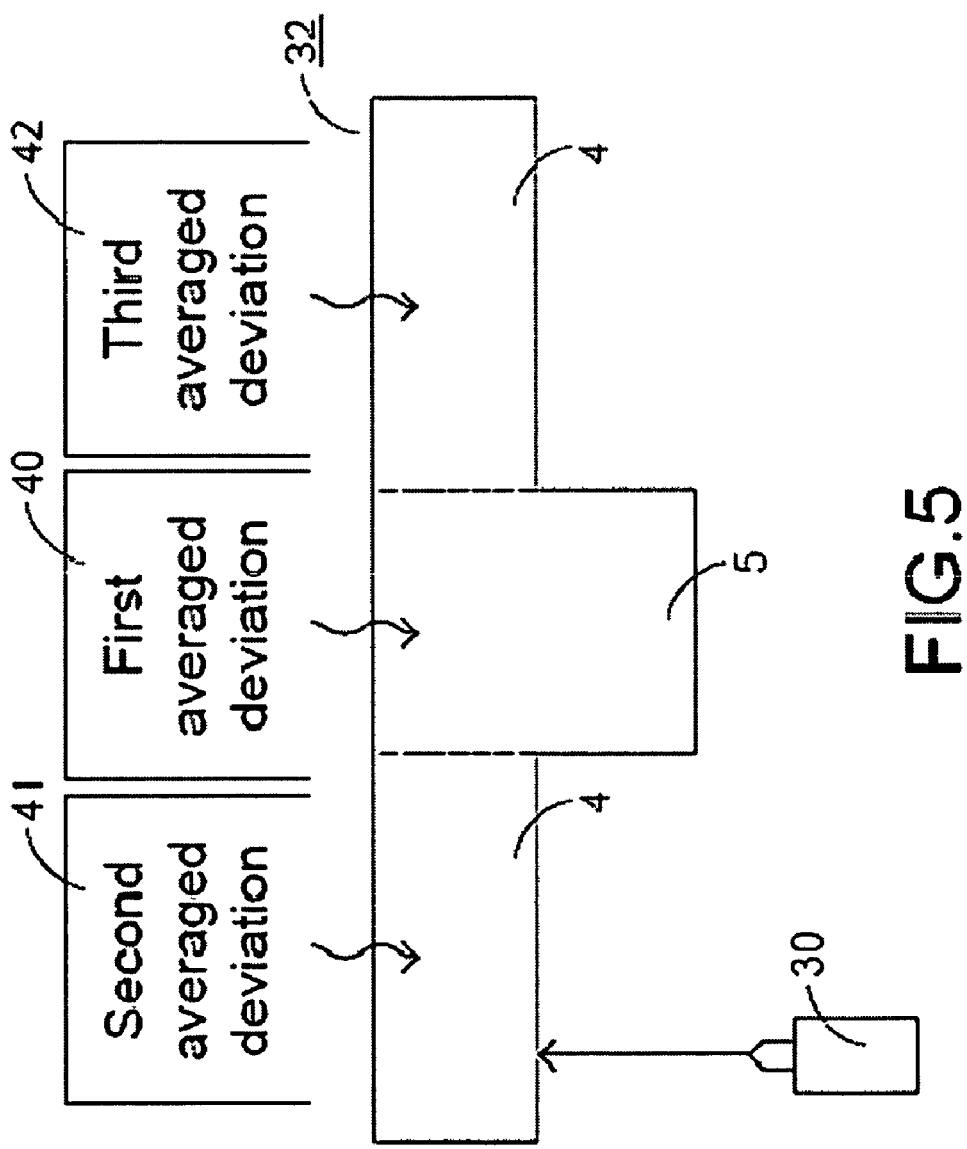
FIG. 5 is a schematic diagram illustrating parameters for implementing another embodiment of the present invention.

In the above examples illustrated in FIGS. 3 and 4(*a*)~4(*h*), the write strategy is adjusted with a land-pit-land configuration. The present method, however, can also be applied to a pit-land-pit configuration, as shown in FIG. 5, in a manner similar to that described above.

The method for adjusting a write strategy according to the present invention can be directly applied to an optical recording/reproducing apparatus in a form of firmware. In addition, the present method can also be applied to an analyzing instrument for optical discs or optical disc drives as a tool for engineers to design or modify optical disc drive.

To sum up, according to the method of the present invention, data is written into the optical disc according to a first write strategy in forms of a first type of data storage structures with variable lengths and a second type of data storage structures with variable lengths. A plurality of the first type of data storage structures corresponding to a specified reference length are located, and the recording lengths thereof are operated with the specified reference length to obtain a first averaged deviation. A plurality of the second type of data storage structures formed next to the first type of data storage structures are located, and the recording lengths thereof are operated with respective reference lengths to obtain a second averaged deviation. A parameter of the first write strategy is adjusted so as to generate a second write strategy for subsequently writing data into the optical disc. Since the method for adjusting a write strategy of an optical recording/reproducing apparatus is performed according to a feature of an optical disc. Therefore, only basic write strategy or strategies need to be stored in the firmware, and other write strategies can be derived from the basic write strategy according to the method of the present invention.

While the invention has been described in terms of what is presently considered to be the most practical and preferred embodiments, it is to be understood that the invention needs not be limited to the disclosed embodiment, for example the audio player has not to be a portable audio player or USB-interfaced audio player. On the contrary, it is intended to cover various modifications and similar arrangements included within the spirit and scope of the appended claims which are to be accorded with the broadest interpretation so as to encompass all such modifications and similar structures.

What is claimed is:

1. A method for adjusting a write strategy of an optical recording/reproducing apparatus for writing data into an optical disc, comprising steps of:

writing data into the optical disc according to a first write strategy wherein the data is stored in the optical disc in forms of a first type of data storage structures with variable lengths and a second type of data storage structures with variable lengths;

locating a plurality of the first type of data storage structures corresponding to a specified reference length and calculating the differences between the recording lengths of the plurality of the first type of data storage structures and the specified reference length to obtain a first averaged deviation;

locating a plurality of the second type of data storage structures formed next to a first side of the first type of data storage structures and calculating the differences between the recording lengths of the second type of data storage structures at the first side and respective reference lengths to obtain a second averaged deviation;

locating a plurality of the second type of data storage structures formed next to a second side of the first type of data storage structures and calculating the differences between the recording lengths of the second type of data storage structures at the second side and respective reference lengths to obtain a third averaged deviation; and adjusting a parameter of the first write strategy so as to generate a second write strategy for subsequently writing data into the optical disc;

wherein a laser power pulse signal is generated to write data into the optical disc according to the first write strategy or the second write strategy, and the parameter to be adjusted is a rising time point resulting in a rising edge of the laser power pulse signal or a falling time point resulting in a falling edge of the laser power pulse signal, and the rising time point is adjusted at following situations: (a1) if all the first, second and third averaged deviations are greater than zero, and the third averaged deviation is greater than the second averaged deviation, (a2) if all the first, second and third averaged deviations are less than zero, and the third averaged deviation is less than the second averaged deviation, (a3) if the first and third averaged deviations are greater than zero, and the second averaged deviation is less than zero, (a4) if the first and third averaged deviations are less than zero, and the second averaged deviation is greater than zero, (a5) if the second and third averaged deviations are less than zero, the first averaged deviation is greater than zero, and the third averaged deviation is greater than the second averaged deviation, and (a6) if the second and third averaged deviations are greater than zero, the first averaged deviation is less than zero, and the third averaged deviation is less than the second averaged deviation.

2. The method according to claim 1 wherein the rising edge of the laser power pulse signal occurs during the transition from the second type of data storage structure at the first side to the first type of data storage structures, and the falling edge of the laser power pulse signal occurs during the transition from the first type of data storage structure to the second type of data storage structures at the second side.

3. The method according to claim 1 wherein the third averaged deviation is obtained by subtracting the respective reference lengths from the recording lengths of the second type of data storage structures at the second side and then averaging the resulting differences.

4. The method according to claim 1 wherein the second averaged deviation is obtained by subtracting the respective reference lengths from the recording lengths of the second type of data storage structures at the first side and then averaging the resulting differences.

5. The method according to claim 1 wherein the first averaged deviation is obtained by averaging the recording lengths of the plurality of the first type of data storage structures corresponding to the specified reference length and then subtracting the specified reference length from the averaged recording length of the plurality of the first type of data storage structures.

6. The method according to claim 1 wherein the recording lengths of the second type of data storage structures correspond to the same reference length or different reference lengths.

7. The method according to claim 1 wherein the first type of data storage structure and the second type of data storage structure are alternately formed with variable lengths to specify data.

8. The method according to claim 1 wherein the first type of data storage structure and the second type of data storage structure are a pit structure and a land structure, respectively.

9. The method according to claim 1 wherein the first type of data storage structure and the second type of data storage structure are a land structure and a pit structure, respectively.

10. The method according to claim 1 wherein the falling time point is adjusted at following situations: (b1) if all the first, second and third averaged deviations are greater than zero, and the third averaged deviation is less than the second averaged deviation, (b2) if all the first, second and third averaged deviations are less than zero, and the third averaged deviation is greater than the second averaged deviation, (b3) if the first and second averaged deviations are greater than zero, and the third averaged deviation is less than zero, (b4) if the first and second averaged deviations are less than zero, and the third averaged deviation is greater than zero, (b5) if the second and third averaged deviations are less than zero, the first averaged deviation is greater than zero, and the third averaged deviation is less than the second averaged deviation, and (b6) if the second and third averaged deviations are greater than zero, the first averaged deviation is less than zero, and the third averaged deviation is greater than the second averaged deviation.

11. The method according to claim 1 wherein the rising time point is advanced at following situations: (a2) if all the first, second and third averaged deviations are less than zero, and the third averaged deviation is less than the second averaged deviation, (a4) if the first and third averaged deviations are less than zero, and the second averaged deviation is greater than zero, and (a6) if the second and third averaged deviations are greater than zero, the first averaged deviation is less than zero, and the third averaged deviation is less than the second averaged deviation.

12. The method according to claim 1 wherein the rising time point is delayed at following situations: (a1) if all the first, second and third averaged deviations are greater than zero, and the third averaged deviation is greater than the second averaged deviation, (a3) if the first and third averaged deviations are greater than zero, and the second averaged deviation is less than zero, and (a5) if the second and third averaged deviations are less than zero, the first averaged deviation is greater than zero, and the third averaged deviation is greater than the second averaged deviation.

13. The method according to claim 1 wherein the falling time point is advanced at following situations: (b1) if all the first, second and third averaged deviations are greater than zero, and the third averaged deviation is less than the second averaged deviation, (b3) if the first and second averaged deviations are greater than zero, and the third averaged deviation is less than zero, and (b5) if the second and third averaged deviations are less than zero, the first averaged deviation is greater than zero, and the third averaged deviation is less than the second averaged deviation.

14. The method according to claim 1 wherein the falling time point is delayed at following situations: (b2) if all the first, second and third averaged deviations are less than zero, and the third averaged deviation is greater than the second averaged deviation, (b4) if the first and second averaged deviations are less than zero, and the third averaged deviation is greater than zero, and (b6) if the second and third averaged deviations are greater than zero, the first averaged deviation is less than zero, and the third averaged deviation is greater than the second averaged deviation.

* * * * *